United States Patent
Ghanbari et al.

(10) Patent No.: US 10,621,151 B2
(45) Date of Patent: Apr. 14, 2020

(54) ELASTIC, EPHEMERAL IN-LINE DEDUPLICATION SERVICE

(71) Applicant: NetApp, Inc., Sunnyvale, CA (US)

(72) Inventors: Saeed Ghanbari, New Haven, CT (US); Barry Patrick Benight, San Jose, CA (US); Deepak Raghu Kenchammana-Hosekote, Mountain View, CA (US); Shiva Chaitanya, Watertown, MA (US)

(73) Assignee: NetApp Inc., Sunnyvale, CA (US)

( * ) Notice: Subject to any disclaimer, the term of this patent is extended or adjusted under 35 U.S.C. 154(b) by 649 days.

(21) Appl. No.: 14/866,683

(22) Filed: Sep. 25, 2015

(65) Prior Publication Data
US 2017/0091232 A1    Mar. 30, 2017

(51) Int. Cl.
*G06F 16/215* (2019.01)
*G06F 16/2458* (2019.01)
*G06F 16/174* (2019.01)

(52) U.S. Cl.
CPC ........ *G06F 16/215* (2019.01); *G06F 16/1748* (2019.01); *G06F 16/2471* (2019.01)

(58) Field of Classification Search
CPC .......... G06F 17/30156; G06F 11/1453; G06F 3/0641; G06F 3/0608; G06F 16/215; G06F 16/2471; G06F 16/1748
USPC ... 707/692, E17.002, E17.01, 693, 664, 758, 707/813, 822, E17.005, E17.044, 637, 707/640, 653, 694, 728, 791, 796, 802, 707/E17.001, 609, 610, 616, 639, 641, 707/648, 649, 650, 662, 667, 687, 690, 707/701, 749, 774, 814, 816, 827, 707/999.003, 999.101, 999.204;
(Continued)

(56) References Cited

U.S. PATENT DOCUMENTS

| 8,121,993 B2 * | 2/2012 | Blount | G06F 21/32 |
| | | | 707/698 |
| 8,706,971 B1 * | 4/2014 | Nayak | G06F 12/0873 |
| | | | 711/133 |

(Continued)

OTHER PUBLICATIONS

Opendedup, "Administration Guide for Version 2.0", Opendedup Global Deduplication, http://www.opendedup.org/sdfs-20-administration-guide as visited on Aug. 29, 2015, 16 pages.

*Primary Examiner* — Jay A Morrison
*Assistant Examiner* — Ken Hoang
(74) *Attorney, Agent, or Firm* — Cooper Legal Group, LLC

(57) ABSTRACT

A deduplication service can be provided to a storage domain from a services framework that expands and contracts to both meet service demand and to conform to resource management of a compute domain. The deduplication service maintains a fingerprint database and reference count data in compute domain resources, but persists these into the storage domain for use in the case of a failure or interruption of the deduplication service in the compute domain. The deduplication service responds to service requests from the storage domain with indications of paths in a user namespace and whether or not a piece of data had a fingerprint match in the fingerprint database. The indication of a match guides the storage domain to either store the piece of data into the storage backend or to reference another piece of data. The deduplication service uses the fingerprints to define paths for corresponding pieces of data.

20 Claims, 11 Drawing Sheets

(58) Field of Classification Search
USPC ......... 711/E12.103, 162, 159, 161, E12.001,
711/112, 114, 117, 135, 170, 202, 133,
711/154, E12.002, E12.022, E12.058,
711/E12.06, E12.069, 111, 116, 136, 141;
709/201, 203, 215, 217, 223, 224, 244,
709/247
See application file for complete search history.

(56) References Cited

U.S. PATENT DOCUMENTS

| | | | |
|---|---|---|---|
| 8,732,133 B2* | 5/2014 | Attarde | G06F 11/3442 707/664 |
| 9,501,421 B1* | 11/2016 | Cheriton | G06F 12/10 |
| 10,282,256 B1* | 5/2019 | Patil | G06F 11/1453 |
| 2012/0143835 A1* | 6/2012 | Aronovich | G06F 11/1453 707/696 |
| 2012/0150826 A1* | 6/2012 | Vijayan Retnamma | G06F 3/067 707/692 |
| 2014/0101113 A1* | 4/2014 | Zhang | G06F 11/1453 707/692 |

* cited by examiner

ELASTIC, EPHEMERAL IN-LINE DEDUPLICATION SERVICE

BACKGROUND

The disclosure generally relates to the field of data processing, and more particularly to data processing for storage efficiency.

An enterprise level data center or storage system can be logically separated into a storage front end and a storage backend. The storage front end includes devices that are exposed to clients of the storage system. The storage front end devices may be referred to as storage controllers, servers, or filers. The storage backend includes devices that host data and serve data to the storage front end. The storage backend devices may be referred to as storage arrays, storage devices, attached storage, or networked storage.

An organization with a storage system configured for archival or cold storage purposes will have high storage density (e.g., shingled magnetic recording (SMR) devices) in the storage backend and have minimal computational resources (e.g., low cost processors and a relatively small amount of memory) in the storage front end. The minimal computational resources will often be devoted to reliability and space management. An archival or cold storage system is often designed with minimizing cost per gigabyte (GB) as the primary goal. Such a system can be characterized with write-and-read-rarely patterns. Thus, the system is not configured for maximizing input/output operations per second (IOPS).

BRIEF DESCRIPTION OF THE DRAWINGS

Embodiments of the disclosure may be better understood by referencing the accompanying drawings.

DESCRIPTION

Figure 1:
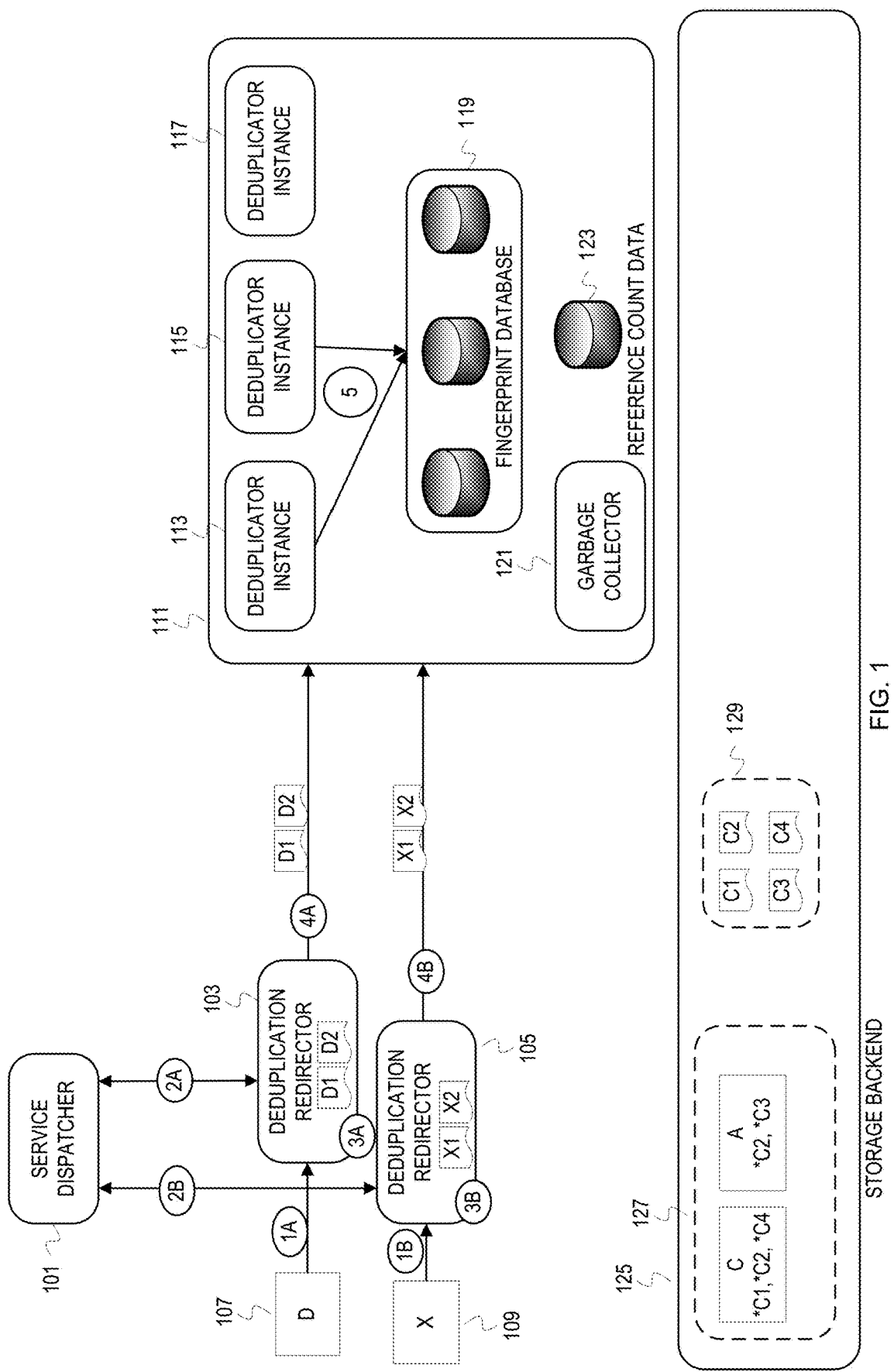
FIG. 1 depicts different instances of a deduplication redirector requesting deduplication of files.

The description that follows includes example systems, methods, techniques, and program flows that embody aspects of the disclosure. However, it is understood that this disclosure may be practiced without these specific details. For instance, this disclosure refers primarily to an external, elastic, ephemeral deduplication service alone, but the disclosed deduplication service may be provided as one of many services in a services framework that adapts to service demand from a storage domain and resource management in a compute domain. In other instances, well-known instruction instances, protocols, structures and techniques have not been shown in detail in order not to obfuscate the description.

Overview

An environment (e.g., an organization's data center) can be logically separated into a storage domain and a compute domain. The storage domain includes devices and software of a storage front end and a storage backend. The compute domain includes other devices and software that are not part of the storage domain. For instance, the compute domain can include a server farm or compute cluster. The compute domain may be a heterogeneous compute domain (e.g., servers in a computer cluster could have varying amounts of random access memory (RAM), could have flash or hard disk drive (HDD) storage, etc.). The two domains can share network resources (e.g., switches, routers, cabling, etc.) and have dedicated network resources. This separation of the compute domain and the storage domain allows for managing resources in the domains independently and configuration of the domains for particular purposes. For instance, the storage domain can be configured with resources that support a primary purpose of the storage domain, such as cold storage or archiving. Thus, the storage domain can be configured with high density storage devices (e.g., tape storage and SMR devices) and low computational resources (e.g., slower processors with smaller caches and less system memory). With less performance oriented resources in the storage domain, the storage domain may not be capable of efficiently performing various services (e.g., deduplication, compression, encryption, watermarking, etc.). In some cases, the storage domain can perform services (e.g., deduplication), but not without violating service level objectives (SLOs). This disclosure refers to an in-line deduplication service that is external to the storage domain, elastic, and ephemeral. The service can be considered elastic because it can expand or contract based on available resources and service demand. The service can be considered ephemeral because the underlying resources (e.g., processors, memory, etc.) can fail or disappear without warning.

With more computational resources in the compute domain, an in-line deduplication service can be provided to the storage domain. The in-line deduplication is provided to the storage domain while being de-coupled from the storage domain. The in-line deduplication service can utilize computational resources of the compute domain and provide service to the storage domain without violating SLOs defined for either domain. Since the compute domain possibly takes priority over the storage domain, the compute domain may take resource management actions that reduce resources available to the deduplication service. Thus, the deduplication service is designed to gracefully react to diminishing resources in the compute domain. However, the compute domain may provision additional resources for the deduplication service. Therefore, the deduplication service is also configured to scale up and take advantage of additional resources. In addition to the compute domain resources, the deduplication service uses resources of the storage domain for failover. The deduplication service maintains a fingerprint database and reference count data in compute domain resources, but persists these into the storage domain for use in the case of a failure or interruption of the deduplication service in the compute domain. A namespace is defined in the storage domain for the deduplication service to maintain this failover data. The deduplication service responds to service requests from the storage domain with indications of paths in a user namespace and whether or not a piece of data had a fingerprint match in the fingerprint database. The indication of a match guides the storage domain to either store the piece of data into the storage backend or to reference another piece of data. The deduplication service uses the fingerprints to define paths for corresponding pieces of data. Using the fingerprints as paths supports idempotent writes that avoid inconsistencies that could arise during concurrent writes of the same data or when the deduplication service is interrupted.

Example Illustrations

Figure 2:
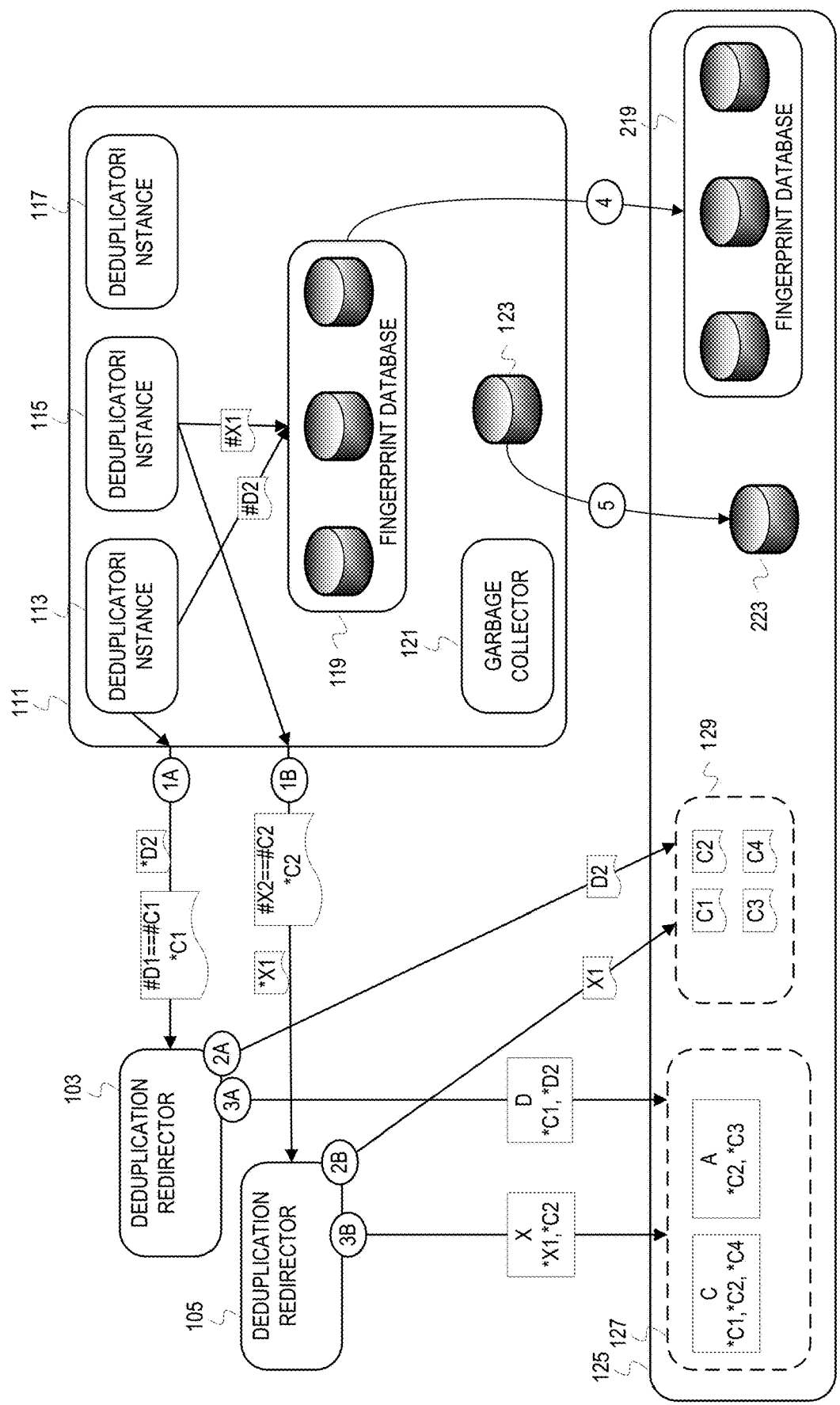
FIG. 2 depicts deduplication service responses to the deduplication requests from the deduplication redirector instances.
Figure 3:
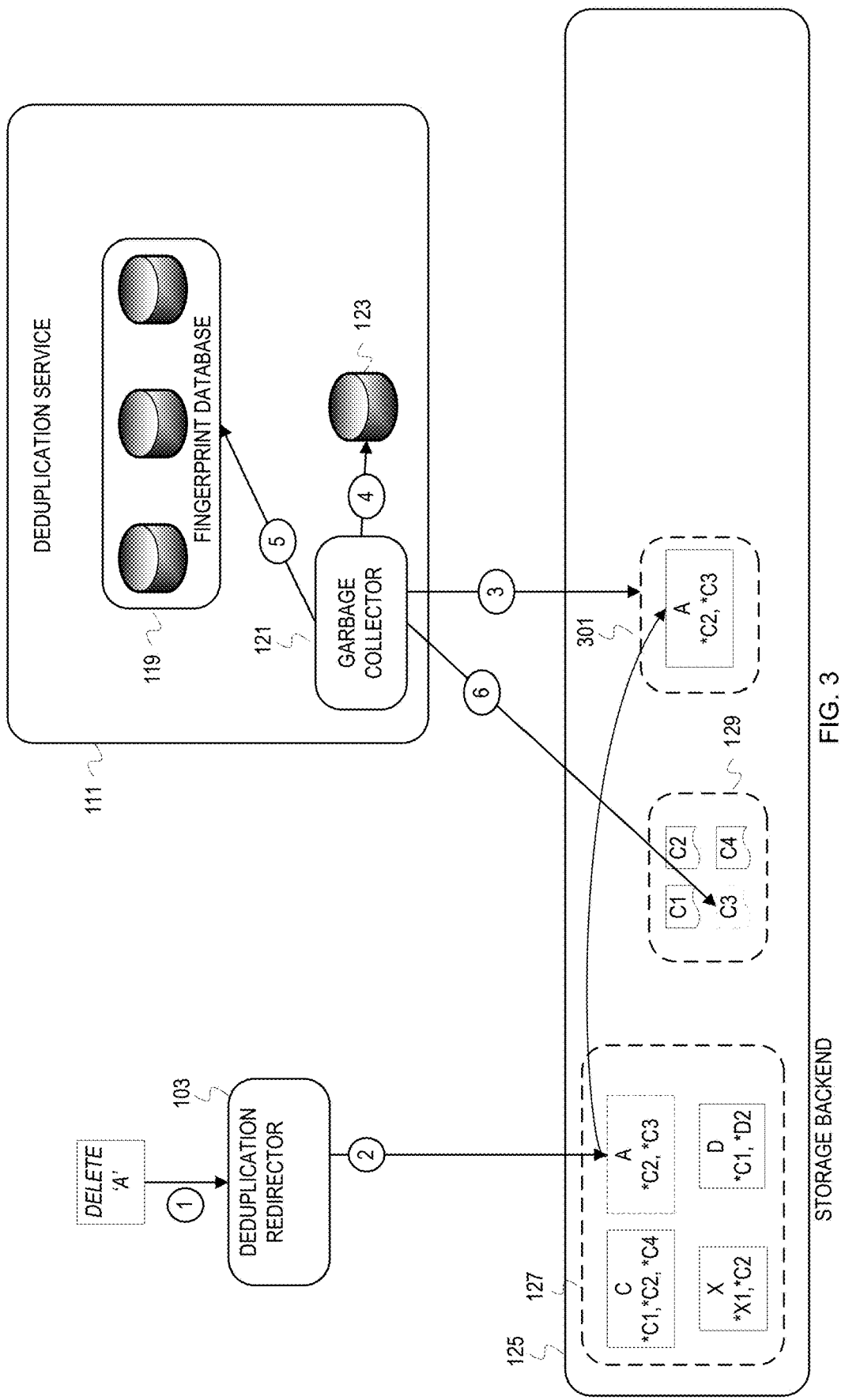
FIG. 3 depicts delete of a file that has been deduplicated by the deduplication service.

FIGS. 1-3 are diagrams depicting example operations of an in-line deduplication service that provides deduplication to a storage domain of a system. The diagrams depict an example of deduplicating a file being written into a storage backend, writing a file into the storage backend, and deletion of a file in the storage backend. FIGS. 1-3 are annotated with a series of numbers. These numbers represent occurrences of operations. An annotation with a number and letter (e.g., 1A and 1B) indicates operations that occur concurrently in the example illustration. Although these operations are ordered for this example, the ordering is one example to aid in understanding this disclosure and should not be used to limit the claims. Subject matter falling within the scope of the claims can vary with respect to the order and some of the operations.

FIG. 1 depicts different instances of a deduplication redirector requesting deduplication of files. In FIG. 1, an environment includes hardware and software that can be logically and physically separated into a storage domain and a compute domain. The storage domain includes a deduplication redirector instance 103, a deduplication redirector instance 105, and a storage backend 125. The deduplication redirector instances 103, 105 run in storage front end devices (not depicted) of the storage domain. Deduplication redirector instances are deployed throughout the storage front end to be in the path of the input/output of the storage backend 125. In this example, the deduplication redirector instances 103, 105 break down a file into ordered file data chunks ("chunking files"), and request deduplication of the file data chunks. The storage backend 125 has defined within it a user space 127 and a service space 129. The user space 127 is a namespace and/or portion of the storage backend that is accessible to clients (e.g., applications) that submit storage requests to the storage front end. The service space 129 is a namespace and/or portion of the storage backend that is used by a deduplication service 111 residing in the compute domain. Although used by the deduplication service 111, the service space 129 can be accessed via the storage domain front end devices or directly from compute domain devices that host components of the deduplication service.

In this illustration, the service space 129 includes file data chunks and the user space 127 includes file manifests. In this description, a file manifest is a file that identifies file data chunks that constitute a file. The file manifest is used to reconstruct a file with the file data chunks. The service space 129 includes file data chunks "C1", "C2", "C3", and "C4". The user space 127 includes two file manifests. A file manifest for a file "C" is depicted and indicates "*C1", "*C2", and "*C4." The annotation of a "*" is used to represent a path to the file data chunk in the service space 129. Thus, the file manifest for file "C" has path values that can be used to obtain the file data chunks C1, C2, and C4. The second file manifest is for a file "A." The file manifest for file A indicates "*C2" and "*C3." Thus, the file data chunks can be obtained with the indicated paths and used to construct the file A. File data chunk C2 has already been deduplicated and is shared by files A and C.

The deduplication service 111 in the compute domain includes multiple components to provide deduplication to the storage domain. The deduplication service includes three deduplicator instances 113, 115, 117. The deduplicator instances 113, 115, 117 can be deployed on different machines and/or virtual machines in the compute domain. The deduplication service 111 can scale up by deploying additional deduplicator instances or scale down by terminating deduplicator instances. The elasticity of the deduplication service 111 is evidenced by its ability to scale up or down in response to demand by the storage domain and/or to comply with resource management in the compute domain. The deduplication service 111 can also reassign deduplication tasks among deployed instances in the case of failures or resource management actions. Deduplicator instances use a fingerprint database 119 in their associated storage resources to determine whether a deduplication can be performed. For this example, the fingerprint database 119 is maintained in storage resources associated with the deduplicator instances 113, 115, and 117. For example, the fingerprint database 119 can be in flash storage devices in the compute domain associated with compute resources that host the deduplicator instances 113, 115, and 117. The fingerprint database 119 can also be in a storage resource of the compute domain that is accessible to any compute domain resource. Another component of the deduplication service 111 is a garbage collector 121. The garbage collector 121 maintains reference count data for donor file data chunks (i.e., the file data chunks referenced for deduplication). The garbage collector 121 also manages donor file data chunks stored in the service space 129 in accordance with the reference count data 123.

At 1A, the deduplication redirector instance 103 receives a request to write a file "D" into the storage backend 125. At 1B, the deduplication redirector instance 105 receives a request to write a file "X" into the storage backend 125. These requests from clients are first processed by a communication/network layer before flowing into or being intercepted by the deduplication redirector instances 103, 105. For this example, it is assumed that deduplication is to be requested for these files. However, deduplication redirector instances 103, 105 may evaluate the requests against policies to determine whether the deduplication service should be requested for these files.

At 2A, the deduplication redirector instance 103 communicates with a service dispatcher 101 to determine a deduplicator instance(s) to provide the deduplication service. At 2B, the deduplication redirector instance 105 communicates with the service dispatcher 101 to determine a deduplicator instance(s) to provide the deduplication service. The service dispatcher 101 is a component running in the compute domain. The service dispatcher 101 may determine provisioning and assignment of other services, but this disclosure focuses on determining deduplicator instances to provide deduplication services to the storage domain. The service dispatcher 101 communicates location (e.g., network address and port) of at least one deduplicator instance to the deduplication redirector instance 103 and at least one deduplicator instance to the deduplication redirector instance 105. The location information can be cached by the redirector instances to avoid repeated lookups from the service dispatcher 101 for subsequent deduplication requests. The service dispatcher 101 can be contacted off the request path to refresh the cached location information. There can be cases when the deduplication service is not available (e.g., insufficient resources in the compute domain for deduplication). In these cases, the service dispatcher 101 will notify deduplication redirector instances that the deduplication service is unavailable.

At 3A, the deduplication redirector instance 103 chunks the file "D" into file data chunks "D1" and "D2." At 3B, the deduplication redirector instance 105 chunks the file "X" into file data chunks "X1" and "X2." Fragmenting files into file data chunks can be in accordance with a configured size. The configured size may be a size based on the underlying storage technology (e.g., filesystem data block size) or administrator defined size (e.g., maximum configured size for an object in object storage), as examples. The configured size may also be dynamic. For instance, the chunk size can be defined to vary depending upon performance goals (e.g., service level objectives) and/or performance metrics (e.g., network latency). As examples, chunk size may be a function of network latency and IOPS at a storage front end device performing the chunking.

At 4A, the deduplication redirector instance 103 supplies the file data chunks "D1" and "D2" to the deduplicator instance(s) of the deduplicator instances 113, 115, 117 identified by the service dispatcher 101. At 4B, the deduplication redirector instance 105 supplies the file data chunks "X1" and "X2" to the deduplicator instance(s) of the deduplicator instances 113, 115, 117 identified by the service dispatcher 101. Any one of the deduplicator instances 113, 115, 117 may have been launched in response to the communication between the service dispatcher 101 and either of the deduplication redirector instances 103, 105.

At 5, the deduplicator instances 113, 115 generate fingerprints from the received file data chunks and determine whether the generated fingerprints have matches in the fingerprint database 119. For this illustration, the service dispatcher 101 previously identified the deduplicator instance 113 to the deduplication redirector instance 103 and the deduplicator instance 115 to the deduplication redirector instance 105. So, the deduplicator instance 117 is not involved in the illustration, although the deduplicator instance 117 may be busy with other deduplication requests. Furthermore, alignment of a deduplicator instance per deduplication redirector instance is only a side effect of this simple illustration. The service dispatcher 101 may assign multiple deduplicator instances to process different sets of file data chunks from a deduplication redirector instance. In addition, the service dispatcher 101 may assign file data chunks from different deduplication redirector instances to a same deduplicator instance, perhaps due to resource policies or resource management in the compute domain.

FIG. 2 depicts deduplication service responses to the deduplication requests from the deduplication redirector instances. The example operations depicted in FIG. 2 illustrate example results of the deduplication requests of FIG. 1.

At 1A, the deduplication service 111 returns a response for the file data chunks "D1" and "D2." The deduplicator instance 113 determined, at stage 5 of FIG. 1, that a fingerprint for D1 matched a fingerprint for C1 ("# D1== # C1"). The fingerprint for C1 was already in the fingerprint database 119. The deduplicator instance 113 indicates in the response to the deduplication redirector instance 103 that D1 had a fingerprint match and indicates the path to the donor file data chunk C1. The deduplicator instance 113 determined that there was no match in the fingerprint database 119 for the fingerprint generated from D2. Without a match in the fingerprint database 119, the deduplicator instance 113 determined a path deterministically derived from the fingerprint of D2 and inserts the D2 fingerprint ("# D2") into the fingerprint database 119. The path is deterministically derived from the D2 fingerprint to ensure consistency in the case of service disruptions or failures that lead to a file data chunk being written more than once into the service space. This also relies on the storage backend supporting idempotent writes to a same path. The response to the deduplicator instance 113 for D2 indicates the path derived from the D2 fingerprint, and that D2 did not have a fingerprint match.

At 1B, the deduplication service 111 returns a response for the file data chunks "X1" and "X2." The deduplicator instance 115 determined that a fingerprint for X2 matched a fingerprint for C2 ("# X2==# C2") that was in the fingerprint database 119. The deduplicator instance 115 indicates in the response to the deduplication redirector instance 105 that X2 had a fingerprint match and indicates the path to the donor file data chunk C2. The deduplicator instance 115 determined that there was no match in the fingerprint database 119 for the fingerprint generated from X1. Without a match in the fingerprint database 119, the deduplicator instance 115 determined a path deterministically derived from the fingerprint of X1 and inserts the X1 fingerprint ("# X1") in the fingerprint database 119. The response to the deduplicator instance 115 for X1 indicates the path derived from the X1 fingerprint, and that X1 did not have a fingerprint match.

At 2A, the deduplication redirector instance 103 stores the file data chunk D2 based on the deduplication response. Since the deduplication response indicates that D2 did not have a fingerprint match, then the deduplication redirector instance 103 stores (via a storage backend interface or subsystem) D2 to the path *D2 in service space 129. D2 is now available as a donor file data chunk. Since D1 had a fingerprint match, D1 is deduplicated. In other words, D1, which is redundant in light of C1, is not stored into the storage backend user space 127.

At 2B, the deduplication redirector instance 105 stores the file data chunk X1 based on the deduplication response for X1. Since the deduplication response indicates that X1 did not have a fingerprint match, then the deduplication redirector instance 105 stores (via a storage backend interface or subsystem) X1 to the path *X1 in the service space 129. X1 is now available as a donor file data chunk. Since X2 had a fingerprint match, X2 is deduplicated.

After storing the file data chunks that lacked a matching fingerprint in the fingerprint database 119, the deduplication redirector instances 103, 105 store file manifests into the user space 127. At 3A, the deduplication redirector instance 103 stores a file manifest for the file D into the user space 127. The file manifest for file D indicates paths in order of the corresponding file data chunks to reconstruct the file D. The paths indicated in the file manifest are *C1 and *D2. At 3B, the deduplication redirector instance 105 stores a file manifest for the file X into the user space 127. The file manifest for file X indicates ordered paths to file data chunks to reconstruct the file X. The paths indicated in the file manifest for X are *X1 and *C2.

At 4 and 5, the deduplication service 111 persists deduplication state data (i.e., the fingerprint database 119 and the reference count data 123) into the storage backend. The deduplication service 111 persists the fingerprint database 119 into the storage backend 125 as a fingerprint database

219. "Persisting" the fingerprint database 119 into the storage backend refers to the operation(s) performed to maintain a current fingerprint database in a durable storage space. This allows for a recovery of the fingerprint database if a failure or resource management action occurs in the compute domain that impacts availability of the fingerprint database 119. As previously mentioned, the in-line deduplication service is supported with ephemeral resources that can "disappear" because of a failure, interruption, or reallocation. Persisting the fingerprint database 119 into persistent storage allows the in-line deduplication service to tolerate this ephemeral nature of the supporting resources. As examples, the deduplication service 111 can persist the fingerprint database 119 by employing a backup application with snapshot functionality, logging database updates in a persistent storage in the compute domain, etc. The fingerprint database 219 may not be the same as the fingerprint database 119 due to a service failure or interruption that does not allow for graceful termination of the deduplication service. Frequency of persist operations can be configured in accordance with a storage domain policy. Persist operations can be configured with longer time gaps between persist operations, which increases the batching of updates. This maximizes the sequential bandwidth utilization of the storage domain, which may be the goal of a storage domain policy defined for an archival storage system. The specific length of the time gap between persisting operations takes into account the client tolerance of lost changes to the fingerprint database 119. Thus, the bandwidth utilization of the storage domain is weighed against the performance impact due to overwriting a file data chunk due to its fingerprint not persisting to the fingerprint database 219. Similar to the fingerprint database 119, the deduplication service 111 persists the reference count data 123 into the storage backend 125 as reference count data 223.

FIG. 3 depicts delete of a file that has been deduplicated by the deduplication service. At some point, a client may request that a file be deleted. In FIG. 3, a client requests deletion of file "A" at 1. At 2, the deduplication redirector instance 103 determines that file A has been deduplicated since the user space 127 has a file manifest for the file A. Since the file A has been deduplicated, the deduplication redirector instance 103 moves the file A manifest into a service space for files to be deleted, referred to herein as delete space 301. Afterwards, the garbage collector 121 of the deduplication service 111 is triggered to maintain the delete space 301 and reference count data 123. At 3, the garbage collector 121 examines content of the delete space 301. The garbage collector 121 determines that the delete space 301 includes the file A manifest. At 4, the garbage collector 121 decrements references counters for C2 and C3 in the reference count data 123 in response to discovering the file A manifest in the delete space 301. For this illustration, decrementing the reference counter for C3 results in 0 references to C3. Therefore, the garbage collector 121 removes the C3 fingerprint from the fingerprint database 119 at 5. The garbage collector 121 also deletes C3 and the path *C3 from the service space 129.

The following flowcharts depicted in FIGS. 4-9 describe example operations for a distributed in-line deduplicaton service. The illustrations of FIGS. 1-3 referred to files, file data chunks, and a file manifest. But the storage domain is not limited to a filesystem storage technology. For instance, the storage backend interface may be an object storage interface. In light of the different storage technologies (e.g., block based storage, file based storage, object based storage) and overloading of terms across technologies (e.g., the term object), the flowcharts refer to a data unit, data sub-units, and data manifest to avoid confusion among terms and unintended confinement to a particular technology due to term use.

Figure 4:
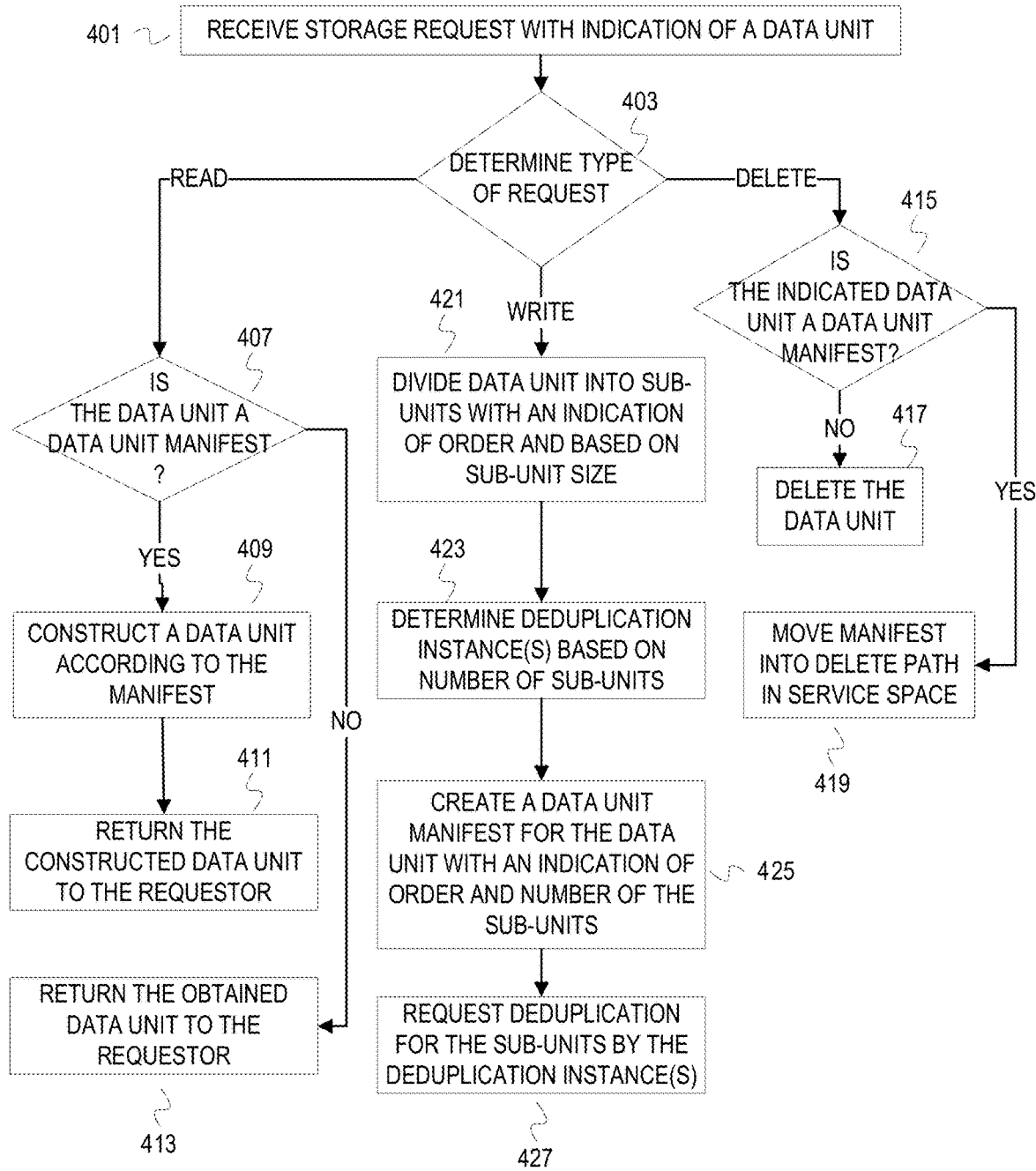
FIG. 4 is a flowchart of example operations for processing storage requests in an environment that uses distributed in-line deduplication service.

FIG. 4 is a flowchart of example operations for processing storage requests in an environment that uses distributed in-line deduplication service. FIG. 4 refers to a redirector performing the operations. A redirector is a generic label used for executing program code that intercepts, receives, or detects a storage request after communication layer processing and that is a component of an in-line deduplication service, but deployed into a storage front end.

At block 401, a redirector receives a storage request with indication of a data unit. The redirector runs on a storage front end device. For example, the redirector may intercept a request that indicates a file handle or an object key. The storage request may be in accordance with a web service protocol that has already passed through transmission control protocol/Internet protocol processing, for example. Or, the storage request may be in accordance with a network attached storage or storage area network based protocol.

At block 403, the redirector determines the type of request. The redirector can determine the type of request from metadata of a request. Although different protocols can define a variety of different requests, most requests can be categorized as a write request, read request, or a delete request. Therefore, the example operations address these categories of requests.

If the received request is a write type of request, then the request references or includes the indicated data unit. The redirector extracts the data unit from the request or obtains the data unit from the reference in the request. The redirector then divides the data unit (previously referred to as chunking when dividing a file) into data sub-units in accordance with a sub-unit size at block 421. The redirector determines sub-unit size from configuration information. As discussed previously, the sub-unit size can be based on the storage system configuration and/or adapt to performance goals. Dividing the data unit can involve the redirector storing each of the data sub-units in a buffer or memory designated for data units with corresponding unfulfilled deduplication requests ("in-flight deduplication requests"). The redirector can store the individual data sub-units with indications of the data unit and order of the data sub-units. Dividing can involve the redirector creating a copy of the data unit and modifying the copy of the data unit to mark the beginning of each sub-unit, thus leveraging the order already provided by the data unit. The redirector could also modify the data unit to include dividing markers without making a copy of the data unit.

At block 423, the redirector determines a deduplicator instance(s) based on the number of yielded sub-units. A deduplication service policy provided to the redirector from the services framework may specify a maximum amount of data to be processed by a single deduplicator instance. Based on this threshold and the size of the sub-units, the redirector can request a number of deduplicator instances that conforms to the policy. Instead of the redirector requesting a certain number of deduplicator instances, the redirector may submit a deduplication service request that includes an indication of the size of the data unit and/or a number of sub-units. A deduplication service can then determine a number of deduplicator instances to assign to the service request. In addition, the deduplication service may select particular deduplicator instances based on capability when deduplicator instances have heterogeneous resources.

At block 425, the redirector creates a data unit manifest for the data unit. The redirector creates the data unit manifest to indicate the data sub-units that constitute the data unit and order of the data sub-units for data unit reconstruction. This data unit manifest is later populated with paths to the constituent sub-units. Although a path can be a path through a hierarchical namespace (e.g., directories to traverse), a path can also be a key in a flat namespace (e.g., namespace in object based storage). Whether a flat namespace or a hierarchical namespace, the path can be considered a namespace identifier that is used to obtain data.

At block 427, the redirector requests deduplication for the data sub-units by the deduplicator instance(s) determined at block 423. The redirector creates a number of requests and sends the requests to the interfaces or locations for the deduplicator instance(s) identified by the deduplication service. The deduplication service may present a single interface to the storage front end. In that case, the redirector sends the requests to the single interface, and the deduplication service forwards the request(s) to the corresponding deduplicator instance(s). The redirector can send a single request that includes the data sub-units, a request for different sets of the data sub-units, or a request for each data sub-unit. In addition to the data sub-units, the request(s) identifies the corresponding data unit for proper association of deduplication responses. Since the deduplicator instance is stateless, the deduplicator instance uses the data unit identifier that is eventually returned in a deduplication response to determine an appropriate data unit manifest.

If the redirector determined at block 403 that the request was read request, then the redirector determines whether the indicated data unit is a data unit manifest in user space at block 407. The redirector may obtain the indicated data unit (e.g., obtain an object by object key or file by file handle) and examine the obtained data unit to determine whether it is a data unit manifest. This can be determined from the retrieved data being a listing of paths to data sub-units or the metadata having a value that indicates a data unit manifest.

If the redirector determines that the obtained data unit is a data unit manifest, then the redirector constructs the data unit according to the manifest at block 409. The redirector issues read requests via the storage backend interface for the data sub-units in accordance with the paths indicated in the data unit manifest. The paths are to data sub-units in service space in the storage backend. The redirector or an associated process can then construct the retrieved data sub-units in accordance with the sub-unit order indicated in the data unit manifest.

At block 411, the redirector returns the constructed data unit to the requestor indicated in the request. For instance, the redirector passes the constructed data unit back to a network layer that processed the original request.

If the redirector determined that the data unit obtained from user space was not a data unit manifest, then the redirector returns the obtained data unit back to the requestor at block 413. For instance, the redirector forwards the response from the storage backend interface to a network layer.

If the redirector determined that the request was a delete request at block 403, then the redirector determines whether the indicated data unit is a data unit manifest at block 415. Similar to block 407, the redirector may obtain the indicated data unit (e.g., obtain an object by object key or file by file handle) and examine the obtained data unit to determine whether it is a data unit manifest. Depending upon the underlying storage technology and/or organization of data units and data unit metadata, the redirector may request metadata for the indicated data unit instead of obtaining the indicated data unit from user space. With the metadata, the redirector can determine whether the metadata indicates that the data unit in user space is a data unit manifest without fetching the data unit.

If the data unit in user space is a data unit manifest, then the redirector moves the data unit manifest to a delete path in service space at block 419. The delete path is inspected by the garbage collector for maintaining a correct reference count.

If the data unit in user space is not a data unit manifest, then the redirector forwards the delete request of the indicated data unit via the storage backend interface at block 417.

Figure 5:
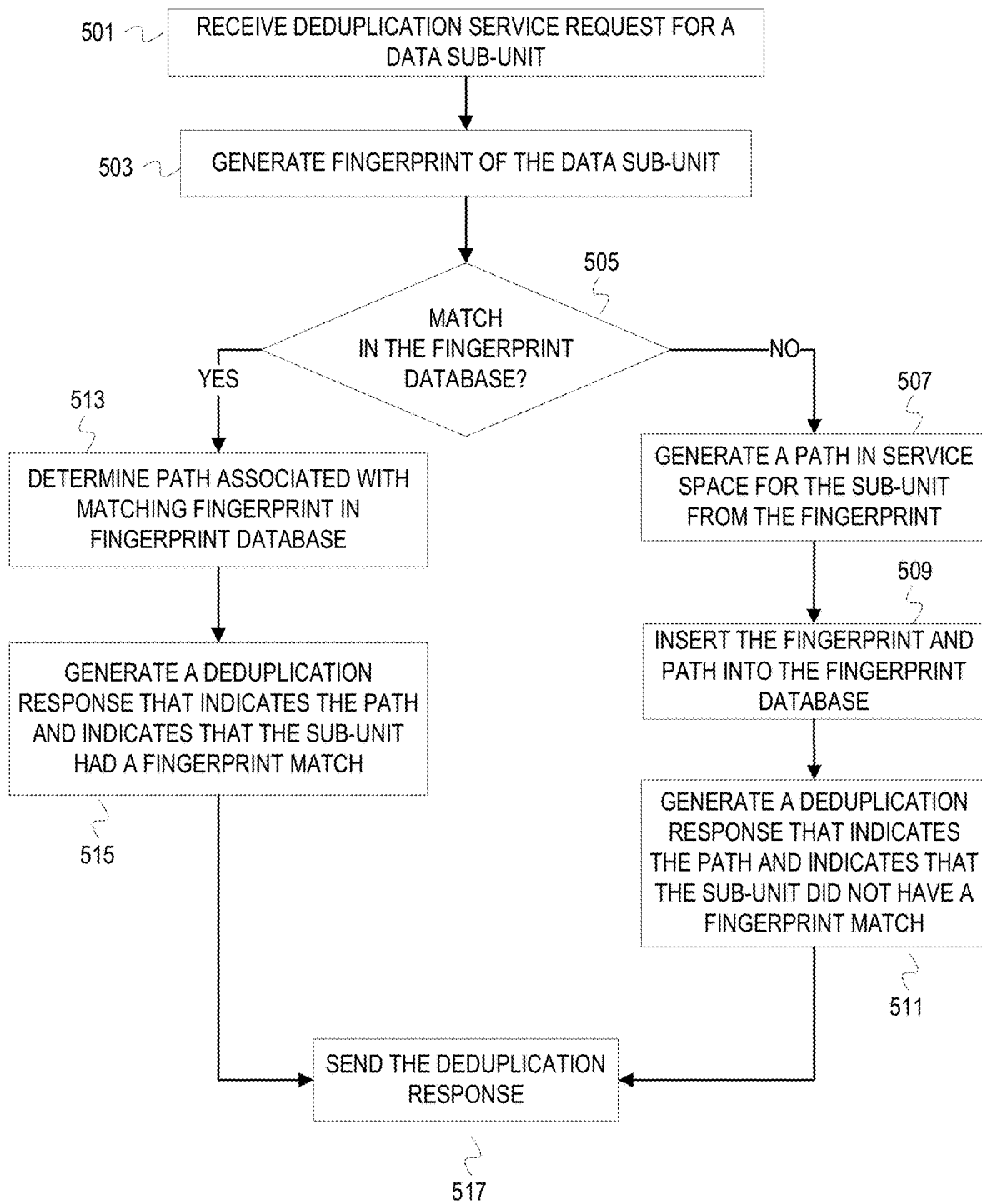
FIG. 5 is a flowchart of example operations for generating a response to a deduplication service request.

FIG. 5 is a flowchart of example operations for generating a response to a deduplication service request. FIG. 5 refers to a deduplicator instance as performing the example operations. A deduplicator instance refers to an executing instance of program code that performs deduplication operations.

At block 501, a deduplicator instance receives a deduplication request for a data sub-unit. The deduplication request includes the data sub-unit and indicates a data unit. The indication of the data unit is a value or identifier that travels with the deduplication request and response to allow the redirector to resolve a response back to an indication of the data unit.

At block 503, the deduplicator instance generates a fingerprint of the data sub-unit. For instance, the deduplicator instance generates a fingerprint with a cryptographic hash function (e.g., a Secure Hash Algorithm (SHA) or MD5) or Rabin's fingerprinting algorithm.

At block 505, the deduplicator instance determines whether the generated fingerprint is already in a fingerprint database.

If the generated fingerprint is already in the fingerprint database, then the deduplicator instance determines a path that is associated with the matching fingerprint in the fingerprint database at block 513. Each record or entry in the fingerprint database includes a fingerprint and a path deterministically derived from the fingerprint.

At block 515, the deduplicator instance generates a deduplication response. The generated deduplication response indicates the path and indicates that the fingerprint of the sub-unit matched a fingerprint in the database. This indication of the matching fingerprint signals to the redirector that the data sub-unit is not to be stored into the storage backend because it would be redundant.

If there is no matching fingerprint in the fingerprint database at block 505, then the deduplicator instance generates a path in service space at block 507. The deduplicator instance generates the path deterministically from the fingerprint as previously mentioned. For instance, the deduplicator instance can use a text or numeric representation of the fingerprint itself as the path.

After generating the fingerprint and corresponding path, the deduplicator instance inserts them into the fingerprint database at block 509. Presence of the fingerprint in the fingerprint database allows for the data sub-unit to be a donor for another sub-unit.

At block 511, the deduplicator instance generates a deduplication response. The generated deduplication response indicates the path and indicates that the fingerprint of the sub-unit did not have a match in the fingerprint in the database. This indication of absence of a matching fingerprint signals to the redirector that the data sub-unit is to be stored into the storage backend at the indicated path.

At block 517, the deduplicator instance sends the generated deduplication response (generated either at block 515 or block 511).

Figure 6:
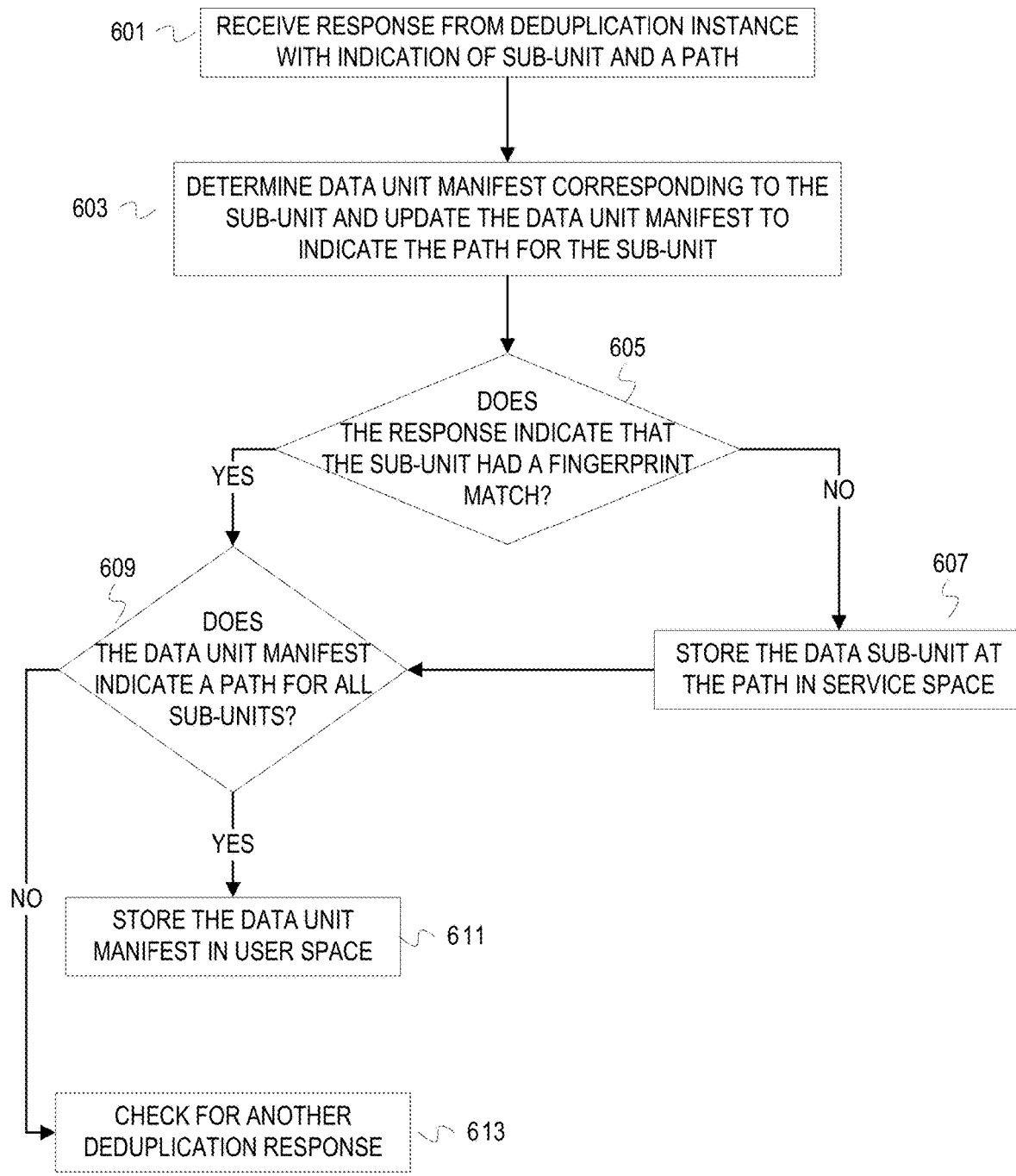
FIG. 6 depicts a flowchart of example operations for processing a deduplication service response.

FIG. 6 depicts a flowchart of example operations for processing a deduplication service response. FIG. 6 refers again to the redirector as the entity performing the example operations for consistency with FIG. 4.

At block 601, a redirector receives a deduplication response from a deduplicator instance. The deduplication response indicates a data sub-unit and a path. The deduplication response indicates the data sub-unit as it was indicated in the deduplication request. For example, the data sub-unit can be indicated with a data unit identifier (e.g., file handle or file name) and an identifier corresponding to the data sub-unit identifier (e.g., offset). The path is a path in service space generated from the data sub-unit fingerprint. For example, the path may be "/deduplication/# D1/" with # D1 being a string representation of the D1 fingerprint.

At block 603, the redirector determines a data unit manifest corresponding to the data unit for the data sub-unit. When the redirector created the deduplication service request, the redirector created a data unit manifest for the data unit and initialized the data unit manifest with indications of the data sub-units. The redirector stored the data unit manifest in a memory associated with the storage front end device that hosts the redirector. The data unit manifests are identified based on the corresponding data unit. This allows the redirector to look up or access the data unit manifest with a data unit identifier. After determining the data unit manifest, the redirector updates the data unit manifest to indicate the path from the deduplication service response. The redirector locates a field or entry in the data unit manifest for the data sub-unit indicated in the deduplication service response and overwrites or modifies the field or entry to indicate the path.

At block 605, the redirector determines whether the deduplication service response indicates that the data sub-unit had a fingerprint match. The deduplication service response includes a flag or value that indicates the lack of a match in the fingerprint database. Without a fingerprint match, the indicated data sub-unit cannot be deduplicated.

At block 607, the redirector stores the data sub-unit to the path indicated in the deduplication service response if the deduplication service response indicates that the data sub-unit did not have a fingerprint match. The redirector generates a command or request that is passed to the storage backend interface. The command or request causes the data sub-unit to be stored at the indicated path. The redirector may generate a separate command or request for creation of the path in the service depending upon the underlying storage technology. Control flows from block 607 to block 609.

At block 609, the redirector determines whether the data unit manifest indicates a path for all data sub-units. This determination is made either after the redirector determines that the deduplication service response indicates that the data sub-unit had a fingerprint match or after the redirector stores the data sub-unit that did not have a fingerprint match into the storage backend. The redirector can make this determination with different techniques based on structure of the data unit manifest. The redirector can scan the data unit manifest to determine whether all of the indicated data sub-units have paths indicated. The redirector can maintain a count of data sub-units for which a deduplication service response has been received and compare the count against a total number of data sub-units of the data unit to determine whether a data unit manifest is complete. If the data unit manifest is complete, then control flows to block 611. Otherwise, control flows to block 613.

At block 611, the redirector stores the data unit manifest into the storage backend. The redirector generates a command that is passed to the storage backend interface to cause the data unit manifest to be stored into the storage backend into the user space. If the request from the client indicated a path, then the data unit manifest is stored into the user space at the indicated path. The data unit manifest is identified as the data unit in user space. For instance, the data unit manifest is identified as file 'A' if the client request was for a file 'A'.

At block 613, the redirector determines whether another deduplication service response is received. The redirector can check a queue or buffer used for deduplication service responses. Alternatively, an interrupt mechanism can be used to invoke the redirector when a deduplication service response is received at the host storage front end device.

Figure 7:
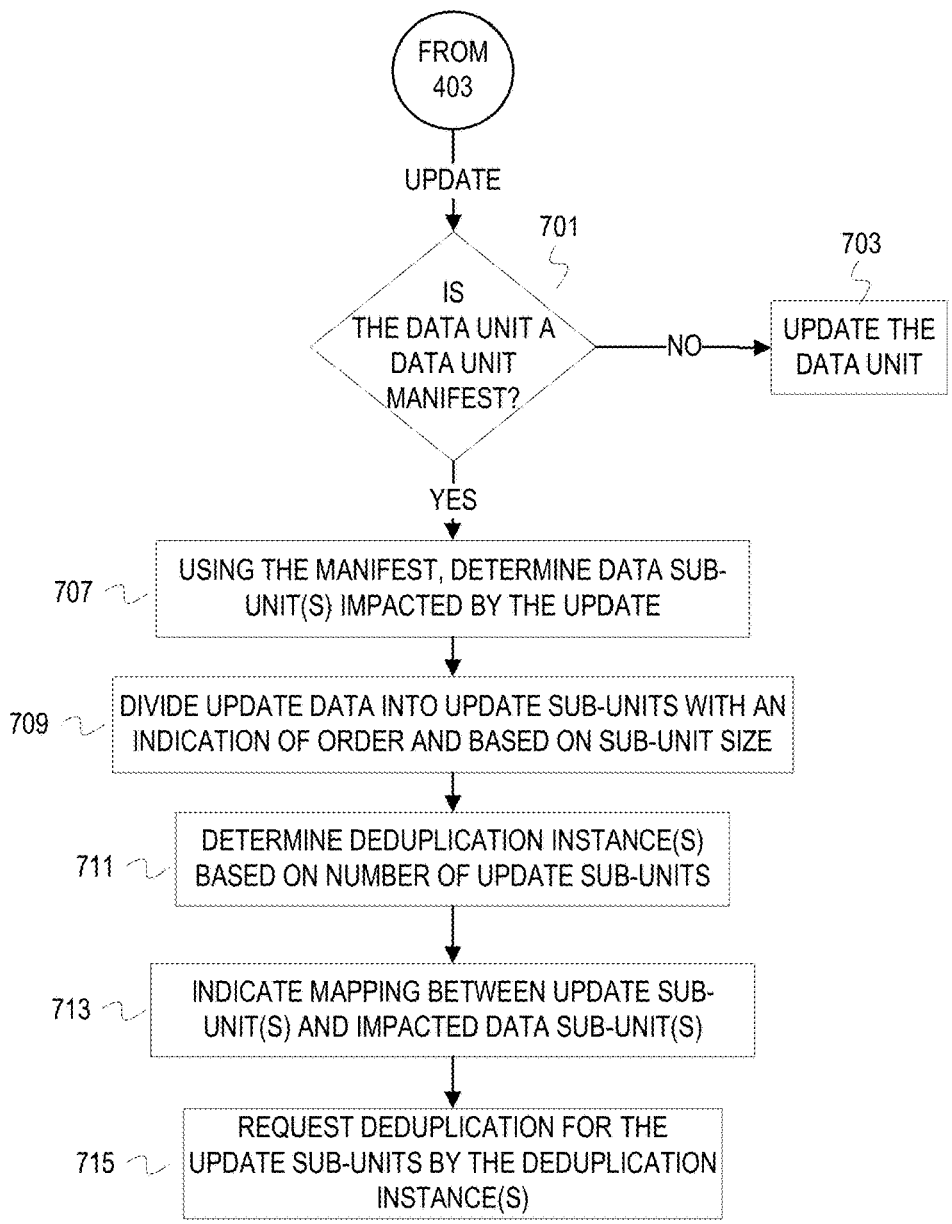
FIG. 7 depicts a flowchart of example operations for processing an update request and requesting a deduplication service for the update request.

FIG. 5 processed requests that were either a read, write, or delete type of request. As mentioned previously, a request may more accurately be categorized as an update request than a write request for some storage protocols. FIG. 7 depicts a flowchart of example operations for processing an update request and requesting a deduplication service for the update request. FIG. 7 again refers to the redirector as performing the example operations for consistency with FIG. 5.

At block 701, a redirector determines whether a data unit indicated in an update request is a data unit manifest. The redirector can obtain the data unit from the user space with an identifier in the update request and examine the data unit to determine whether it is a data unit manifest. The redirector may be able to retrieve metadata of the data unit without retrieving the entire data unit to determine whether the metadata indicates the data unit in user space is a data unit manifest. If the indicated data unit is a data unit manifest, then control flows to block 705. Otherwise, control flows to block 703.

At block 703, the redirector passes the update request to the storage backend interface or allows the update request to continue flowing to the storage backend interface. The redirector may call a function that invokes the storage backend interface and passes along the update request. The redirector may return or move the update request to a buffer, queue, or memory location that the storage backend interface consumes.

At block 707, the redirector determines a data sub-unit(s) impacted by the update request. The redirector can compare offsets of the data sub-units indicated in the data unit manifest against the offset(s) indicated in the update request to determine impacted sub-units.

At block 709, the redirector divides the update data into data sub-units and indicates size and order of the update data sub-units. The redirector divides the update data in accordance with the division of data sub-units indicated in the data unit manifest. If the data unit is operated upon in fixed size sub-units, then the update data units will align with the sub-units. However, the storage redirector may reconcile update extents, for example, with the data sub-units. The redirector will modify the update data to align with the data sub-units. For example, a 27 KB object may have been divided into 10 KB sub-units. The object may have a first sub-unit starting at 0, a second sub-unit starting at 10, and a third sub-unit starting at 20. Assume update data that is 12 KB in length with an offset of 5 KB. For this illustration, the update data impacts the first 2 sub-units. The redirector would retrieve the first two sub-units according to their paths in the data unit manifest. The redirector would then create a first update data sub-unit with 5 KB from the first data sub-unit starting at 0 of the data unit, and with the first 5 KB of data from the update data. The redirector would then create a second update data sub-unit with the remaining 7 KB of the update data and the last 3 KB of data from the second data sub-unit. The redirector then records information that indicates the paths for the first two sub-units may be modified. For example, the redirector can set a flag in the data unit manifest for each of the impacted data sub-units. In addition, the redirector can set the flag in an in-memory data structure created from the data unit manifest. As an example, the redirector can create a hash table indexed by data unit identifier to each of the data sub-units.

At block 711, the redirector determines a deduplication(s) instance to provide the deduplication service. The redirector communicates with a service dispatcher to determine the deduplicator instance(s) that can provide a deduplication service for the update data.

At block 713, the redirector indicates a mapping between the update sub-unit(s) and the impacted data sub-unit(s). The redirector can indicate the mapping by associating an update request identifier (e.g., a session identifier or message hash extracted from the header of the update request) with the update sub-unit. In some cases, the redirector can avoid an explicit indication of mapping when the update sub-unit(s) aligns with the data sub-unit(s) (e.g., correspondence of offsets).

At block 715, the redirector requests deduplication for the update sub-unit(s). The redirector sends the update sub-unit(s) to the deduplicator instance(s) identified by the service dispatcher.

Figure 8:
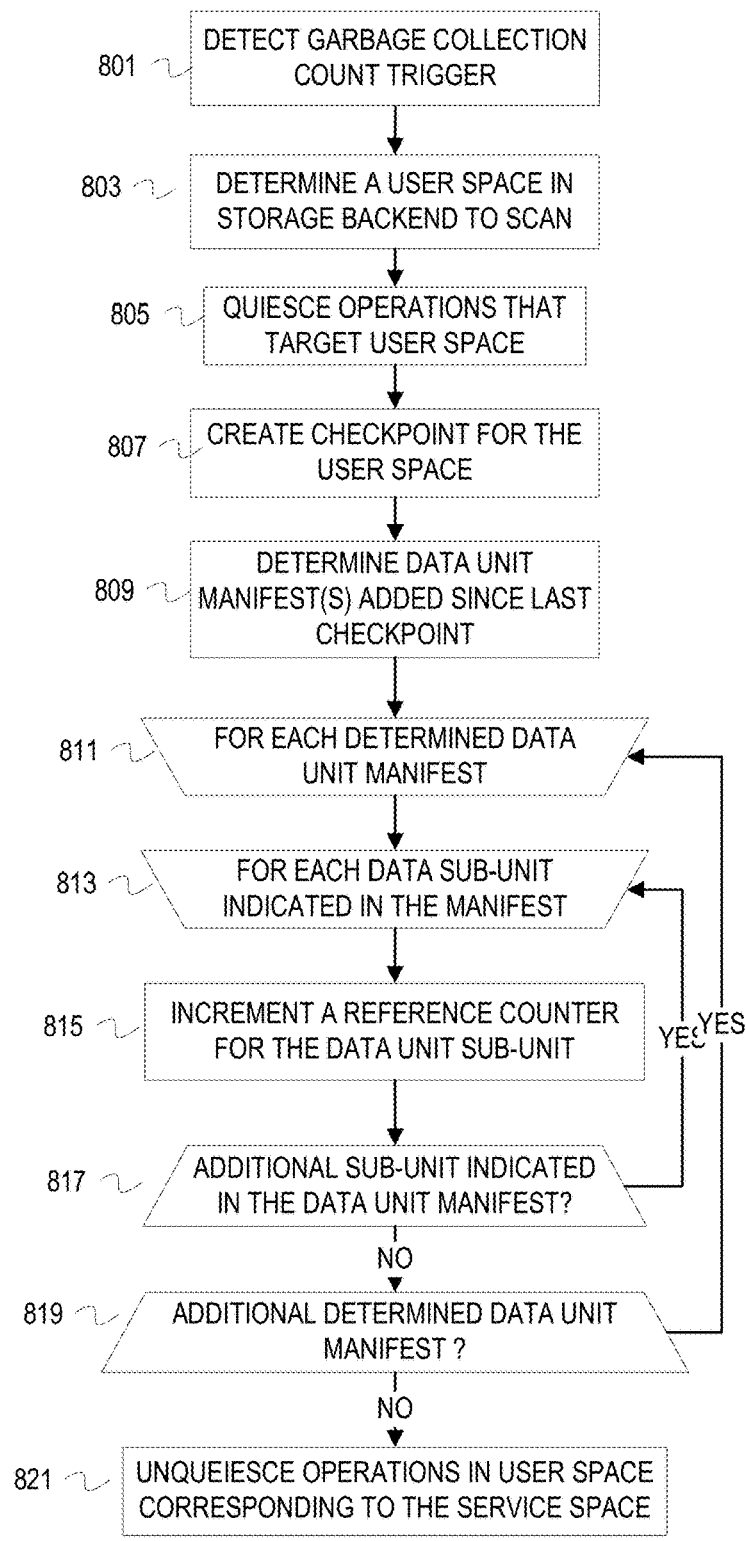
FIG. 8 depicts a flowchart of example operations for incrementing reference count data for the deduplication service.
Figure 9:
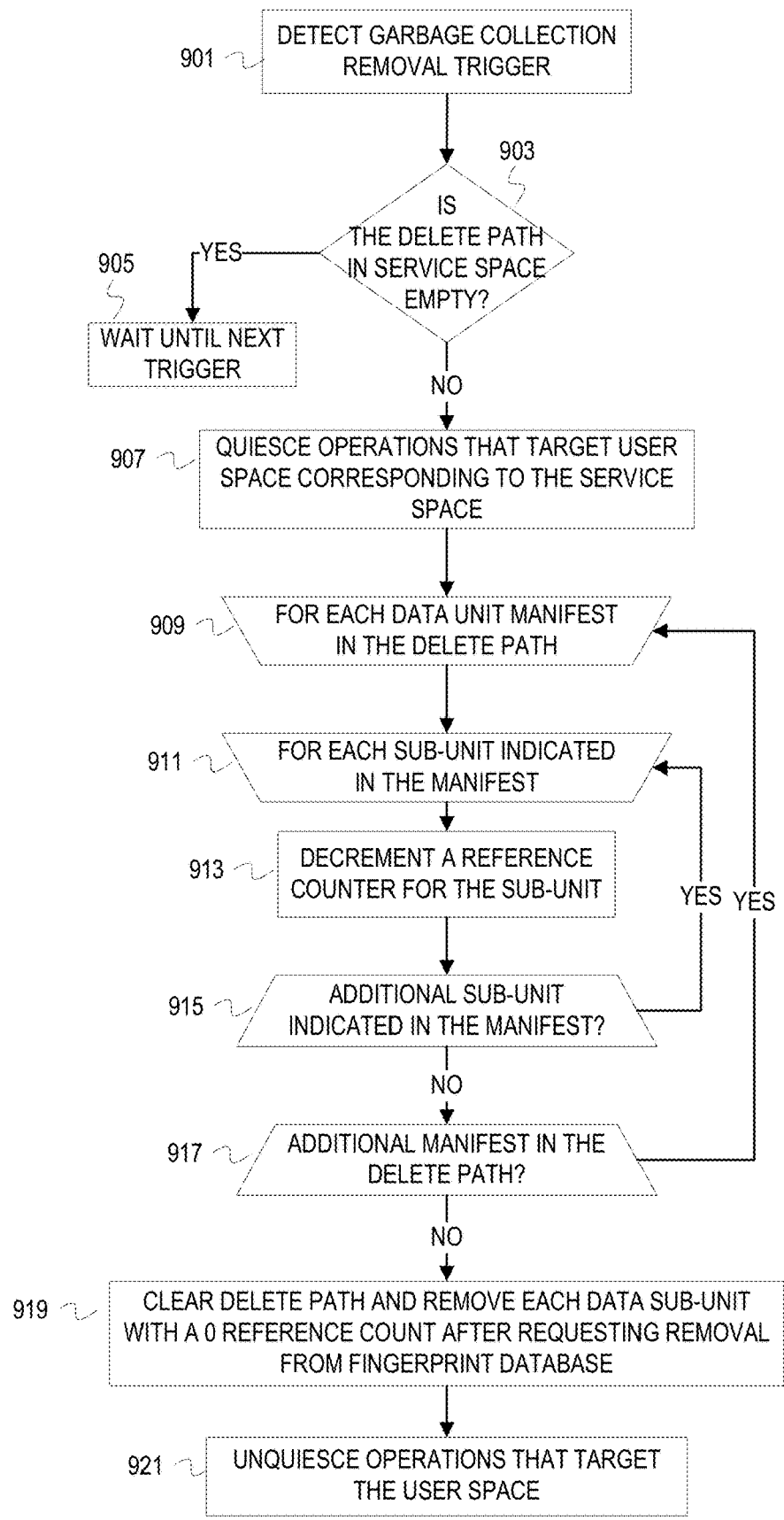
FIG. 9 depicts a flowchart of example operations for decrementing reference counts of a deduplication service.

With data deduplication, reference counts are often maintained. The reference counts indicate the number of references to donor data. This count is used ensure donor data with existing references are not deleted. As discussed earlier, the deduplication service includes a garbage collection component that maintains the reference counts. The garbage collection component performs various operations for the in-line deduplication service to tolerate the ephemeral nature of the supporting resources. FIGS. 8 and 9 depict example operations for maintaining reference count data of a deduplication service. FIG. 8 depicts a flowchart of example operations for incrementing reference count data for the deduplication service. FIGS. 8 and 9 refer to a garbage collector performing the example operations.

At block 801, the garbage collector detects a count trigger. A count trigger can be startup of the garbage collector and/or the deduplication service. The garbage collector may startup initially, after a failure, after an interruption, or after a management action driven termination. The count trigger can also be elapse of a defined periodic interval, a number of writes detected by the deduplication service, resource management actions in the compute domain, etc.

At block 803, the garbage collector determines a user space in a storage backend to scan. The garbage collector can be exposed by configuration to a particular user space. The configuration information can specify a path, mount point, etc.

At block 805, the garbage collector quiesces operations that target the user space. To avoid changes that impact the reference count, the garbage collector requests the storage backend to quiesce operations that target the user space to be scanned.

At block 807, the garbage collector creates a checkpoint for the user space after the user space has stabilized from the quiesce request. For instance, the garbage collector scans the user space based on checkpoints to limit the scan to updates made to the user space since the previous scan. This leverages copy-on-write employed by the storage backend.

At block 809, the garbage collector determines any data unit manifests added to the user space since the last checkpoint. For each new data unit the garbage collector discovers in the user space during the checkpoint scan, the garbage collector evaluates the data unit or metadata of the data unit to determine whether the data unit is a data unit manifest.

At block 811, the garbage collector begins selecting each discovered data unit manifest. At block 813, the garbage collector begins selecting each data sub-unit indication in the selected data unit manifest.

At block 815, the garbage collector increments a reference count for the data sub-unit indicated by the selected data sub-unit indication. The data unit manifest indicates a path for each data sub-unit, and each path can be used to find the corresponding data sub-unit. So, the path can also be used to index reference counts. Thus, the garbage collector can determine a path for a data sub-unit from the data unit manifest, and access a reference count data structure with the path as an index. The access yields the reference count, which the garbage collector then increments.

At block 817, the garbage collect determines whether there is an additional data sub-unit indicated in the data unit manifest. If so, then control flows back to block 813 for selection of the next data sub-unit indication in the selected data unit manifest. Otherwise, control flows to block 819.

At block 819, the garbage collector determines whether there is an additional discovered data unit manifest. If so, then the garbage collector proceeds to select the next data unit manifest at block 811. If all data unit manifests of the checkpoint being scanned have been processed, then control flows to block 821.

At block 821, the garbage collector unquiesces the operations targeting the user space. The garbage collector notifies the storage backend that I/O targeting the user space and/or mount point can be unblocked.

FIG. 9 depicts a flowchart of example operations for decrementing reference counts of a deduplication service. In addition to maintaining the reference counts, the garbage collector also deletes data unit manifests that have been moved for deletion.

At block 901, the garbage collector detects a removal trigger. A removal trigger corresponds to one or more conditions for decrementing reference counts. Examples of a removal trigger include expiration of a time interval, detecting performance of a number of delete requests in the storage domain, detecting a threshold number of data unit manifests in a path defined for data unit manifests to be deleted ("delete path"), a resource related threshold (e.g., consumed storage space or memory exceeding a threshold), etc. The garbage collector can periodically monitor the delete path and begin decrement and cleanup operations when a threshold number of data unit manifests are discovered in the delete path.

At block 903, the garbage collector determines whether the delete path is empty. The delete path is a path in the deduplication service namespace specified for data unit manifests to be deleted. If the delete path is empty, then the garbage collector waits until a next removal trigger at block 905. Otherwise, control flows to block 907.

At block 907, the garbage collector quiesces operations that target the user space corresponding to the service space. To avoid changes that impact the reference count, the garbage collector requests the storage backend to quiesce operations that target the user space. Although the garbage collector is not scanning the user space when performing removal operations, the garbage collector may remove a data sub-unit with a reference count of 0 concurrently with a new data sub-unit being deduplicated with the data sub-unit that has been removed. A service space may correspond to more than one user space (e.g., multiple user spaces and a service space correspond to a same mount point or domain). In that case, the garbage collector performs removal operations separately for each user space.

At block 909, the garbage collector begins selecting each data unit manifest in the delete path. At block 911, the garbage collector begins selecting each data sub-unit indication in the selected data unit manifest.

At block 913, the garbage collector decrements a reference count for the data sub-unit indicated by the selected data sub-unit indication. The garbage collector can determine a path for a data sub-unit from the data unit manifest, and access a reference count data structure with the path as an index. The access yields the reference count, which the garbage collector then decrements.

At block 915, the garbage collect determines whether there is an additional data sub-unit indicated in the data unit manifest. If so, then control flows back to block 911 for selection of the next data sub-unit indication in the selected data unit manifest. Otherwise, control flows to block 917.

At block 917, the garbage collector determines whether there is an additional data unit manifest in the delete path. If so, then the garbage collector proceeds to select the next data unit manifest at block 909. If all data unit manifests in the delete path have been processed, then control flows to block 919.

At block 919, the garbage collector clears the delete path and removes each data sub-unit with a 0 reference count after requesting removal of the corresponding fingerprints from the fingerprint database. After processing the data unit manifests in the delete path, the garbage collector cleans up data sub-units that are no longer referenced. This cleanup includes requesting removal of fingerprints from the fingerprint database and removing the data sub-units. As the garbage collector decrements reference counts, the garbage collector can track those data sub-units by fingerprint, for example, when the reference count is decremented to 0 and generate the requests for removal (deletion or mark for deletion) the fingerprint from the fingerprint database. The garbage collector would submit the removal request to a deduplicator instance or a process/node responsible for maintaining the fingerprint database. The garbage collector could also scan the reference count data to determine all data sub-units with a 0 reference count after processing the data unit manifests in the delete path. With the fingerprints of data sub-units having a 0 reference count, the garbage collector can request removal of the fingerprints from the fingerprint database and delete the data sub-units from the paths corresponding to the fingerprints. The garbage collector also deletes the data unit manifests in the delete path after processing them.

At block 921, the garbage collector unquiesces the operations targeting the user space. The garbage collector notifies the storage backend that I/O targeting the user space and/or mount point can be unblocked.

The above illustrations have referred to the storage domain and compute domain, but deployment of the deduplication service within a compute domain can vary. For instance, each deduplicator instance can be running on a separate physical device, on virtual machines, or mixed deployment of individual devices and virtual machines. In addition, the software components can be organized differently than in the example illustrations. The deduplication tasks, for instance, can be further decomposed than suggested in the example illustrations above. As an example, the deduplication service can instantiate program code for fingerprint generation separately from program code for accessing and maintain the fingerprint database. These different software components can communicate with each other within the compute domain (e.g., using inter-process communication mechanisms).

Figure 10:
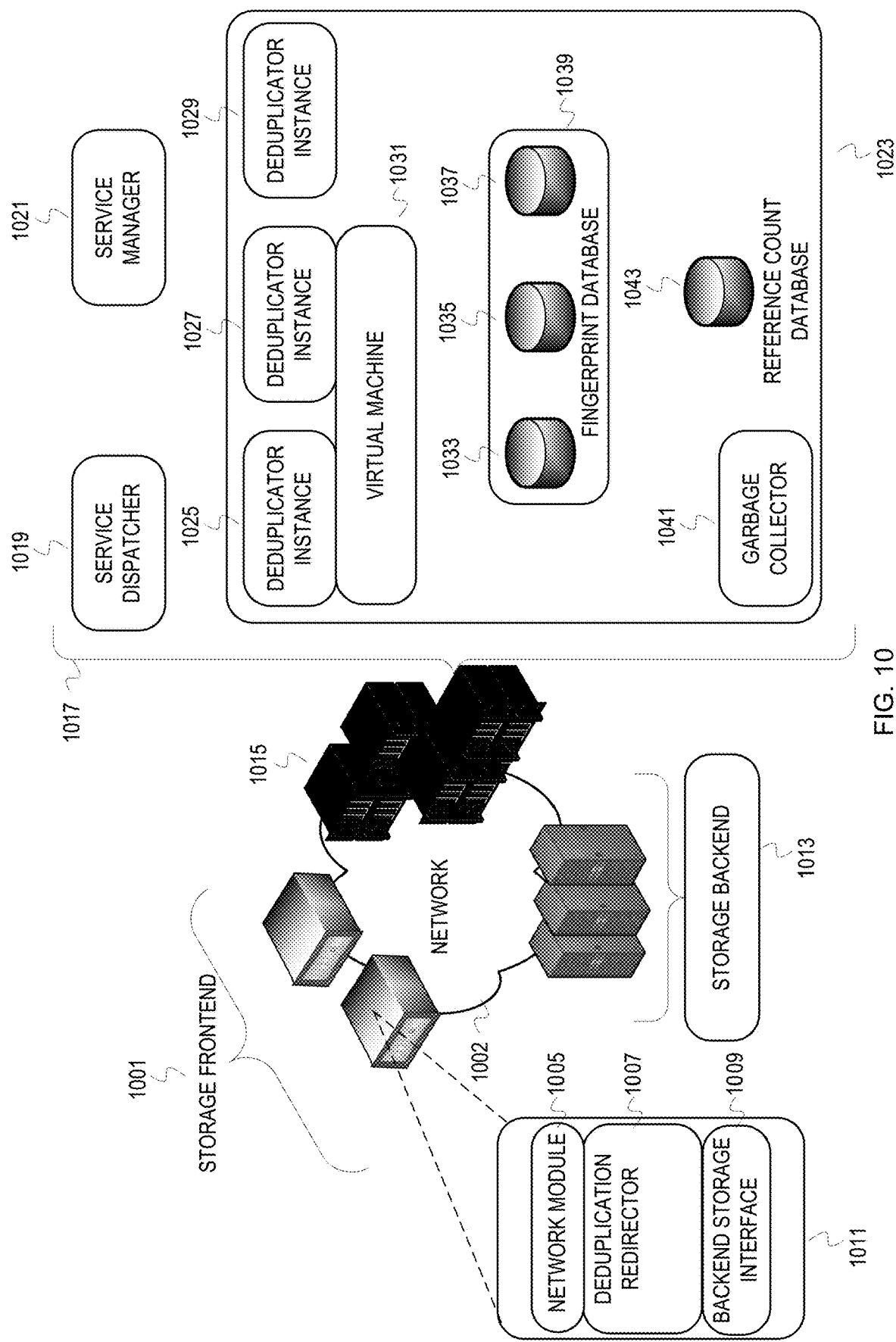
FIG. 10 depicts an example deployment of the deduplication service and the fingerprint database of the deduplication service.

FIG. 10 depicts an example deployment of the deduplication service and the fingerprint database of the deduplication service. In FIG. 10, an environment includes a storage domain and a compute domain 1015. The storage domain includes a storage front end 1001 and a storage backend 1013. The storage front end 1001 is depicted with two storage front end devices, although it likely includes a greater number. Each storage front end device hosts an operating system that includes at least a redirector. One of the depicted storage front end devices is illustrated as hosting an operating system 1011. The operating system 1011 includes a software stack. The software stack includes a network module 1005, a deduplication redirector 1007, and a backend storage interface 1009. The network module 1005, which itself may be a network stack, processes client requests in accordance with the encapsulating communication protocol. Output of the network module 1005 is received or intercepted by the deduplication redirector 1007. Output that is not modified by the deduplication redirector 1007 flows to the backend storage interface 1009 for servicing of the client request. As described above, the deduplication redirector 1007 may itself generate requests based on the client request and pass those requests to the storage backend interface 1009. The storage backend 1013 includes a number of storage devices, arrays, disk racks, etc.

The storage domain and the compute domain 1015 are interconnected with a network 1002, which can include a variety of communication hardware that can vary by consuming domain. For instance, a subnet of the network 1002 can communicate in accordance with Fibre Channel while the rest of the network communicates in accordance with Ethernet.

The compute domain 1015 includes several physical compute devices and corresponding resources. The compute domain can include its own storage devices (e.g., solid state storage devices). The compute domain 1015 supports a services framework or services architecture 1017. The services framework 1017 provides services to the storage domain in accordance with resources provisioned to the services framework 1017 from the compute domain, and some resources from the storage domain. The services framework 1017 can provide several services, but only an external, elastic, ephemeral deduplication service 1023 is illustrated. The services framework 1017 includes a service dispatcher 1019 and a service manager 1021. The service dispatcher 1019 determines instances of services for the storage domain. The service manager 1021 manages resources in accordance with a defined resource policy and/or resource management actions driven by a resource manager (e.g., cluster scheduler) of the compute domain 1015, and manages resources allocated to the services framework 1017 among the different services. The services framework 1017 is considered elastic because it expands and contracts in accordance with service demand, available resources, and performance goals. This expansion and contraction can involve transfer of service instances among nodes (virtual machines or physical machines) in the compute domain 1015, instantiating new service instances, terminating service instances.

The deduplication service 1023 includes three deduplicator instances (1025, 1027, 1029), a fingerprint database 1039, a garbage collector 1041, and a reference count database 1043. The deduplicator instances 1025, 1027 run on a virtual machine 1031 of the compute domain. The deduplicator instance 1029 runs on its own physical device (and associated resources) of the compute domain 1015. The garbage collector 1041 can also run on a virtual machine, or its own physical device. The garbage collector 1041 can be a process, for example a background process, managed by the service manager 1021. The service manager 1021 can determine when the garbage collector 1041 is run. The service manager 1021 can explicitly invoke the garbage collector 1041 or define configuration information that influences running of the garbage collector 1041. The fingerprint database 1039 is depicted in this example illustration as a scale out database distributed across nodes 1033, 1035, 1037. The nodes 1033, 1035, 1037 can be virtual machine nodes, physical device nodes, or a combination thereof. Implementing the fingerprint database as a distributed scale out database allows the fingerprint database to expand or contract in accordance with resource changes in the services framework 1017 and/or changes in service demand pressure from the storage domain. The nodes can be responsible for different shards of the fingerprint database in the case of horizontal database partitioning. As a more specific example, the fingerprint database 1039 can be implemented as a distributed hash table with the fingerprints as the indexes or keys. The services framework 1017 can add nodes to the fingerprint database 1039 to scale up and remove nodes to scale down. With the distributed database, each node's data of the fingerprint database can be persisted to storage separately. The database can also be configured with a built-in data redundancy policy, for example replication or erasure coding, to avoid recovering from a persisted database when a node fails. If nodes fail, then new nodes can be rapidly instantiated from any redundant copies of the database, if available, on the compute domain or started with the persisted data in the storage domain. If an individual node fails, then a new node can be instantiated or started with the persisted data of the failed node.

A failure of one of the nodes that maintain the fingerprint database or a failure of a deduplicator instance would be considered a partial failure of the deduplication service. A partial failure due to loss of a deduplicator instance can impact throughput performance for ingesting data, but can be remedied by launching another deduplicator instance, assuming sufficient resources are available. A partial failure of the deduplication service related to the fingerprint database, for example the loss of a database node, may result in loss of some fingerprints. When a fingerprint is lost, deduplicator instances do not have awareness of whether the corresponding data has already been stored. If the corresponding data is received again, a receiving deduplicator instance processes the corresponding data as new to the deduplication service. Thus, the deduplicator instance will generate a fingerprint to be inserted into the fingerprint database. The corresponding data will be written into storage (again). Since the destination is deterministically derived from the fingerprint, the data will be written to the same location (i.e., the already stored data is overwritten with the same data). Despite the impact on efficiency by a partial failure, the deduplication service and storage continue to be operational.

In some situations, the deduplication service may become unavailable. This would be considered a total failure of the deduplication service. When this occurs, storage continues to operate without deduplication. Although storage efficiency is impacted, the storage system remains operational.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 4 can vary when dividing data units is handled within the deduplication service (e.g., by a deduplicator instance) instead of the redirector. The redirector would send a deduplication service request with the data unit, and a deduplicator instance can divide the data unit into data sub-units before fingerprint generation. In addition, the redirector may determine the deduplicator instance(s) (block 423) prior to dividing the data unit into data sub-units (block 421). In some embodiments, the identified deduplicator instances influence how the data unit is divided by the redirector. As another example of how operations can vary from those depicted, the redirector may evaluate a received request against a service policy. This evaluation would guide the redirector in requesting (or not requesting) the deduplication service. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Another possible variation relates to data that is maintained for the deduplication service. The example illustrations discuss maintain the data sub-unit paths in the fingerprint database. But this can be avoided since the paths are deterministically determined from the fingerprints. The fingerprint itself may be the path or the path can be inexpensively reconstructed from the fingerprint (e.g., concatenating a value with the fingerprint). Avoiding storing the path in addition to the fingerprint reduces the metadata footprint of the deduplication service.

Example illustrations related to maintenance operation (e.g., operations by the garbage collector) refer to quiescing. However, it is not necessary to quiesce operations that target the user space when performing maintenance operations. The storage system may implement a paradigm that allows for maintenance operations to run on a space while also servicing requests that target the space. For example, the storage system may implement fine grain locking on objects accessed by the garbage collector. As another example, the storage system may implement a pre-determined/static data partitioning paradigm.

The above example illustrations refer to accessing data in a certain manner that presumes a particular type of data structure, but the claims should not be limited to a particular data structure. For instance, the example illustrations refer to accessing the reference count data with the fingerprint as an index, but embodiments are not limited to encoding the reference count data in an indexed structure. The reference count data can be stored in a database that uses the paths as keys, or a combination of data unit identifier and data sub-unit identifier (e.g., the key can be a file handle and offset). With respect to the data unit manifest, the entries in the manifest can be inodes that indicate the paths to the data sub-units.

Furthermore, the example illustrations align sub-units to fixed sizes. Embodiments, however, are not limited to fixed size data sub-units. Data units can be divided into variable sized data sub-units and the fingerprints in the fingerprint database can be for variable sized data sub-units. For update requests in a system that allows for variable sized data sub-units, the redirector can avoid maintaining a mapping between update sub-units and impacted sub-units. This mapping can also be avoided if the system implements copy-on-write since a different data unit manifest would be created in response to an update to a data unit. For the copy-on-write scenario, the system would rename the data unit manifest as it would rename any other data unit in accordance with the copy-on-write mechanism.

The examples refer to software components including a "deduplication redirector," "redirector," and a "manager." These constructs are used to generally refer to implementation of functionality for various operations in the deduplication service and the services framework that is external to the storage domain. These constructs are utilized since numerous implementations are possible. A redirector or a manager may be a program, application, thread, process, implemented on a particular component or components of a machine (e.g., a particular circuit card enclosed in a housing with other circuit cards/boards), implemented in a machine-executable program or programs, firmware, etc. The terms are used to efficiently explain content of the disclosure. Although the examples refer to operations being performed by a particular redirector or manager, different entities can perform different operations and be labeled with different names without substantially deviating from the disclosure. Some of this possible variation arises from platform constraints, system specification, programming languages, and developer design choices.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 11:
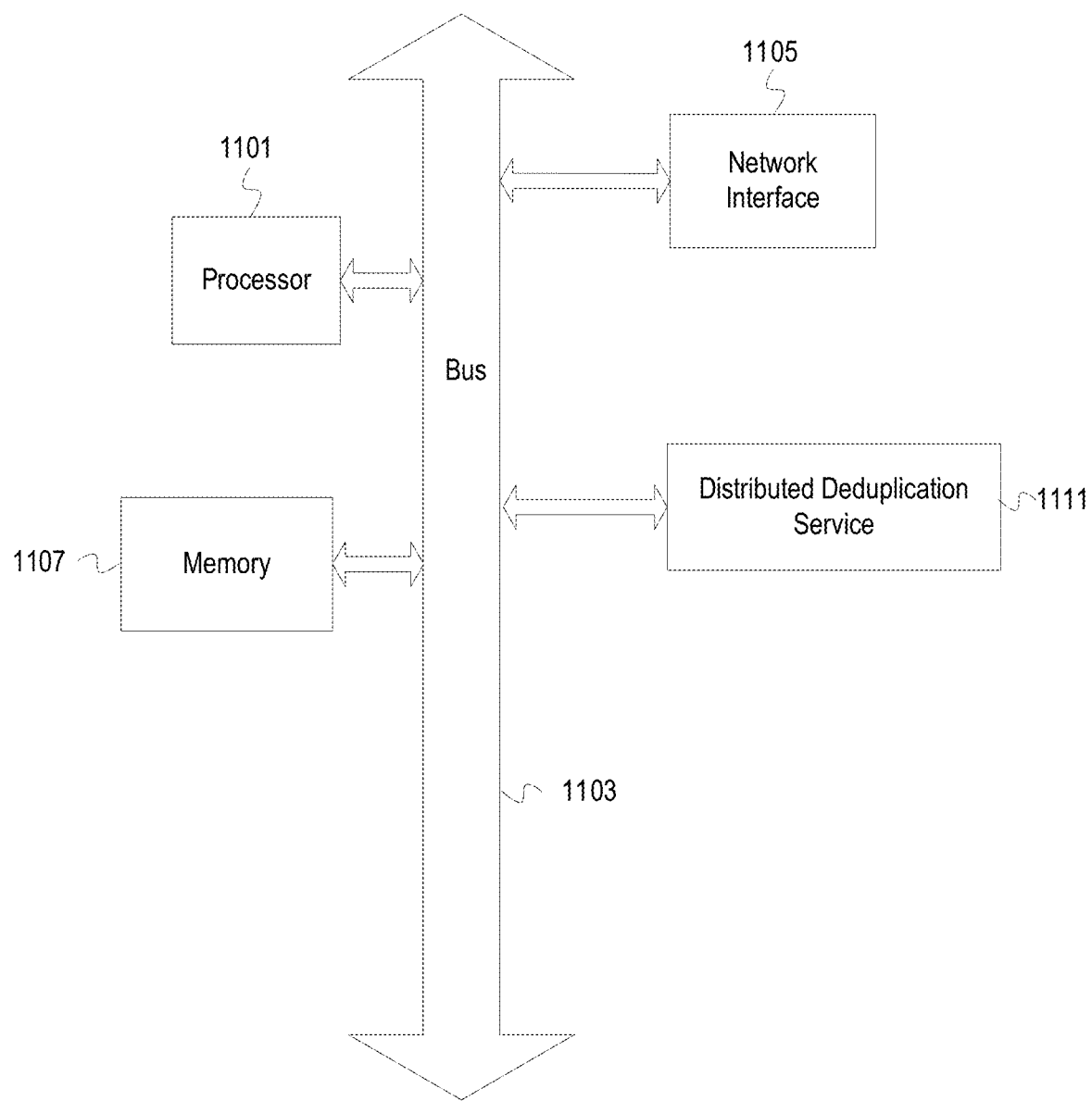
FIG. 11 depicts an example computer system with a distributed deduplication service module.

FIG. 11 depicts an example computer system with a distributed deduplication service module. The computer system includes a processor unit 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1103 (e.g., PCI, ISA, PCI-Express, HyperTransport® bus, InfiniBand® bus, NuBus, etc.) and a network interface 1105 (e.g., a Fiber Channel interface, an Ethernet interface, an internet small computer system interface, SONET interface, wireless interface, etc.). The system also includes a distributed deduplication service module 1111. The distributed deduplication service module 1111 performs deduplication operations (e.g., fingerprint generation, fingerprint comparison) in response to deduplication service requests for data sub-units from a storage domain. The distributed deduplication service module 1111 also maintains a fingerprint database and invokes operations to persist the fingerprint database into a persistent storage that is not impacted by resource management actions in a compute domain. The distributed deduplication service module 1111 may also perform operations previously described as being performed by a garbage collector. Any one of the previously described functionalities may be partially (or entirely) implemented in hardware and/or on the processor unit 1101. For example, the functionality may be implemented with an application specific integrated circuit, in logic implemented in the processor unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101 and the network interface 1105 are coupled to the bus 1103. Although illustrated as being coupled to the bus 1103, the memory 1107 may be coupled to the processor unit 1101.

While the aspects of the disclosure are described with reference to various implementations and exploitations, it will be understood that these aspects are illustrative and that the scope of the claims is not limited to them. In general, techniques for providing a deduplication service that adapts to resource management actions and service demand as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   deploying, by a deduplication service within a compute domain, a number of deduplicator instances for providing deduplication to a storage domain;
   assigning deduplication tasks to the deduplicator instances, wherein a deduplication task instructs a deduplicator instance to return a namespace identifier, an identifier of data evaluated for deduplication, and an indication of whether a fingerprint of the data is found within a fingerprint database in response to a request to deduplicate the data, wherein a deduplication task is performed upon data chunks with chunk sizes varying based upon performance objectives and metrics, and wherein operations are persisted by the deduplicator instance at intervals defined to take into account a client tolerance of lost changes to the fingerprint database; and
   modifying the number of deduplicator instances based upon demand of the storage domain.

2. The method of claim 1, wherein the namespace identifier is derived from the fingerprint of the data.

3. The method of claim 1, wherein the namespace identifier is derived from a matching fingerprint within the fingerprint database based upon the fingerprint of the data matching the matching fingerprint.

4. The method of claim 1, comprising:
   reassigning deduplication tasks amongst the deduplicator instances based upon a resource management action.

5. The method of claim 1, comprising:
   reassigning deduplication tasks amongst the deduplicator instances based upon a failure.

6. The method of claim 1, comprising:
   modifying the number of deduplicator instances to comply with resource management in the compute domain.

7. The method of claim 1, comprising:
   comparing a fingerprint of data within a request with fingerprints of a fingerprint database to determine whether the data is deduplicate data for deduplication, wherein a namespace identifier derived from the fingerprint is returned as a response to the request.

8. The method of claim 1, comprising:
   maintaining reference counts for deduplicated data in the compute domain and periodically storing a copy of the reference counts in the storage domain.

9. The method of claim 8, wherein the maintaining reference counts comprises:
   scanning a user namespace for a data unit manifest added to the user namespace since a previous checkpoint, wherein reference counts of data sub-units within the data unit manifest are incremented.

10. The method of claim 8, wherein the maintaining reference counts comprises:
    decrementing a reference count for a data sub-unit in a data unit manifest that is in a namespace deletion path specified for data unit manifests indicated for deletion.

11. The method of claim 10, comprising:
    deleting the data unit manifest from the namespace deletion path.

12. The method of claim 8, comprising:
    deleting data sub-units having a zero reference count.

13. A non-transitory machine readable medium comprising instructions for performing a method, which when executed by a machine, causes the machine to:
    deploy, by a deduplication service within a compute domain, a number of deduplicator instances for providing deduplication to a storage domain;
    assign deduplication tasks to the deduplicator instances, wherein a deduplication task instructs a deduplicator instance to return a namespace identifier, an identifier of data evaluated for deduplication, and an indication of whether a fingerprint of the data is found within a fingerprint database in response to a request to deduplicate the data, wherein a deduplication task is performed upon data chunks with chunk sizes varying based upon performance objectives and metrics, and wherein operations are persisted by the deduplicator instance at intervals defined to take into account a client tolerance of lost changes to the fingerprint database; and
    modify the number of deduplicator instances based upon demand of the storage domain.

14. The non-transitory machine readable medium of claim 13, wherein the instructions cause the machine to:
    deploy additional deduplicator instances.

15. The non-transitory machine readable medium of claim 13, wherein the instructions cause the machine to:
    terminate a deduplicator instance.

16. The non-transitory machine readable medium of claim 13, wherein the instructions cause the machine to:
reassign deduplication tasks amongst the deduplicator instances based upon a resource management action.

17. The non-transitory machine readable medium of claim 13, wherein the instructions cause the machine to:
reassign deduplication tasks amongst the deduplicator instances based upon a failure.

18. A computing device comprising:
a memory comprising machine executable code for performing a method; and
a processor coupled to the memory, the processor configured to execute the machine executable code to cause the processor to:
deploy, by a deduplication service within a compute domain, a number of deduplicator instances for providing deduplication to a storage domain;
assign deduplication tasks to the deduplicator instances, wherein a deduplication task instructs a deduplicator instance to return a namespace identifier, an identifier of data evaluated for deduplication, and an indication of whether a fingerprint of the data is found within a fingerprint database in response to a request to deduplicate the data, wherein a deduplication task is performed upon data chunks with chunk sizes varying based upon performance objectives and metrics, and wherein operations are persisted by the deduplicator instance at intervals defined to take into account a client tolerance of lost changes to the fingerprint database; and
modify the number of deduplicator instances based upon demand of the storage domain.

19. The computing device of claim 18, wherein the machine executable code causes the processor to:
reassign deduplication tasks amongst the deduplicator instances based upon a resource management action.

20. The computing device of claim 18, wherein the machine executable code causes the processor to:
reassign deduplication tasks amongst the deduplicator instances based upon a failure.

* * * * *